US011946725B2

(12) United States Patent
Leyzerovich et al.

(10) Patent No.: US 11,946,725 B2
(45) Date of Patent: Apr. 2, 2024

(54) SECURITY OUTFIT

(71) Applicants: Elchanan Leyzerovich, Bnei Brak (IL); Josef Lior Cohen, Rosh Ha'ayin (IL)

(72) Inventors: Elchanan Leyzerovich, Bnei Brak (IL); Josef Lior Cohen, Rosh Ha'ayin (IL)

( * ) Notice: Subject to any disclaimer, the term of this patent is extended or adjusted under 35 U.S.C. 154(b) by 263 days.

(21) Appl. No.: 17/626,132

(22) PCT Filed: Nov. 16, 2020

(86) PCT No.: PCT/IL2020/051184
§ 371 (c)(1),
(2) Date: Jan. 11, 2022

(87) PCT Pub. No.: WO2021/105980
PCT Pub. Date: Jun. 3, 2021

(65) Prior Publication Data

US 2022/0260343 A1 Aug. 18, 2022

(30) Foreign Application Priority Data

Nov. 25, 2019 (IL) ........................................ 270911

(51) Int. Cl.

| | |
|---|---|
| ***F41H 1/00*** | (2006.01) |
| ***F41H 1/02*** | (2006.01) |
| ***F41H 13/00*** | (2006.01) |
| ***G08B 15/00*** | (2006.01) |
| ***G08B 21/02*** | (2006.01) |
| *G08B 3/10* | (2006.01) |

(52) U.S. Cl.
CPC ........... *F41H 1/02* (2013.01); *F41H 13/0018* (2013.01); *G08B 15/005* (2013.01); *G08B 21/02* (2013.01); *G08B 3/10* (2013.01)

(58) Field of Classification Search
CPC ..... F41H 1/02; F41H 13/0018; G08B 15/005; G08B 21/02; G08B 3/10
See application file for complete search history.

(56) References Cited

U.S. PATENT DOCUMENTS

| | | | | |
|---|---|---|---|---|
| 6,961,227 | B1 * | 11/2005 | Whiton ................ | A41D 13/008 361/232 |
| 8,776,662 | B1 * | 7/2014 | Hoenes ................. | F41H 5/0457 109/58 |
| 2003/0063003 | A1 | 4/2003 | Bero et al. | |
| 2004/0235514 | A1 | 11/2004 | Bloch et al. | |
| 2004/0264099 | A1 * | 12/2004 | Sikes ....................... | H05C 1/06 361/232 |
| 2005/0197686 | A1 | 9/2005 | Vlad | |

(Continued)

FOREIGN PATENT DOCUMENTS

| | | |
|---|---|---|
| CN | 107687793 A | 2/2018 |
| KR | 20170011944 A | 2/2017 |

*Primary Examiner* — Pete T Lee
(74) *Attorney, Agent, or Firm* — AlphaPatent Associates Ltd.; Daniel J. Swirsky

(57) ABSTRACT

In one aspect, the preset invention is directed to a security outfit, comprising a stabbing and cutting resistant outfit; a stabbing and cutting resistant gloves; and a controllable electroshocking system including a plurality of electroshocking terminals dispersed on an external side of the outfit and gloves; wherein the electroshocking system comprising an active state, being a state in which the terminals are active; and an idle state, being a state in which the electroshocking terminals are suspended.

15 Claims, 7 Drawing Sheets

(56) References Cited

U.S. PATENT DOCUMENTS

| | | | |
|---|---|---|---|
| 2008/0061993 | A1 | 3/2008 | Fong et al. |
| 2011/0126335 | A1 | 6/2011 | Schultz |
| 2015/0070813 | A1 | 3/2015 | Knapp |

* cited by examiner

SECURITY OUTFIT

TECHNICAL FIELD

The present invention relates to the field of security guard protection devices.

BACKGROUND ART

The term “security guard” or “guard” refers herein to a policeman, a soldier, a security person, and the like.

A security guard in a scene where an incident may occur may be in two situations when confronted with an attacker: defense or attack. A guard may be equipped with a gun, but he may not always be able to pull the gun out in time, because the attack can be surprising. In addition, not all security guards are trained in contact combat (“wrestling”), so they may be in an inferior situation.

The dangers in which a security guard may be: to be shot by a bullet, stabbed by a knife, hit by a blunt object, kidnaped, and more.

Over the years, efforts have been made to provide a security guard with tools to protect himself, such as an impenetrable bulletproof vest, anti-stabbing vest, gun that shoots only if certain person pulls its trigger, an electric shocker, taser gun, and more.

Therefore, there is a continuing need to improve the protection and attack facilities of security guards.

It is an object of the present invention to provide a solution to the above-mentioned and other problems of the prior art.

Other objects and advantages of the invention will become apparent as the description proceeds.

SUMMARY OF THE INVENTION

The present invention is directed to a “security outfit” for a security guard. The security outfit comprises protective means, offensive means, and detection means for detecting a threat on the security guard that wears the outfit, and consequently turning the outfit into an offensive state.

The term “security outfit” refers herein to an outfit made of protective fabric resistant against stabbing and cutting. The outfit includes an electroshocking system for electroshocking an attacker, and more particularly temporarily disrupting muscle functions and/or inflicting pain without causing “significant” injury.

In one aspect, the preset invention is directed to a security outfit, comprising a stabbing and cutting resistant outfit;

a stabbing and cutting resistant gloves; and a controllable electroshocking system including a plurality of electroshocking terminals dispersed on an external side of the outfit and gloves;

wherein the electroshocking system comprising an active state, being a state in which the terminals are active; and an idle state, being a state in which the electroshocking terminals are suspended.

The security outfit according may further comprise a collar, for preventing stubbing and cutting a neck of a user thereof.

According to one embodiment of the invention, entering into the active state is carried out by a mechanism for detecting a fist form of one of the gloves.

According to one embodiment of the invention, the fist form is detected by sensors detecting a contact of a thumb of one of the gloves with a middle finger of the glove.

The security outfit may further comprise a mechanism comprising a distance sensor for detecting presence of an object closer than a predefined threshold to the security guard, and consequently turning the electroshocking system to the active state.

The security outfit may further comprise a mechanism employing at least one sensor for detecting an object approaching to the security outfit in a velocity greater than a predetermined threshold, and consequently turning the electroshocking system into the active state.

The security outfit may further comprise an audio system for sounding a scary sound along with electroshocking.

The security outfit may further comprise mechanical hit sensors (such as piezoelectric sensors) dispersed on the outfit, so that as a result of detecting a hit of a force greater than a predetermined threshold, the electroshocking system enters into its active state.

The security outfit may further comprise a sensor for detecting a movement of an arm of the security guard in a speed greater than a threshold, so that as a result the electroshocking system enters into its active state.

The security outfit may further comprise a sensor for metering a vertical deviation of the security guard, so that upon exceeding a predetermined threshold, the electroshocking system enters into its active state.

The security outfit may further comprise a camera for continuously photographing a back area of the security guard, and an image processing system, for detecting an object approaching to the security guard in a velocity greater than a predetermined threshold, so that as a result the electroshocking system enters into its active state.

The security outfit may further comprise at least one distance sensor for continuously metering a distance between an object and the security guard, for detecting an object approaching to the security guard in a velocity greater than a predetermined threshold, so that as a result the electroshocking system enters into its active state.

The security outfit may further comprise further comprising an infrared sensor, for detecting presence of an object in a vicinity of the security guard, so that as a result the electroshocking system enters into its active state.

The security outfit may further comprise a tilt sensor, for detecting whether the security guard is lying, so that as a result the electroshocking system enters into its active state.

The security outfit may further comprise an audio system, for playing a sound upon electroshocking.

In another aspect, the present invention is directed to a group of security outfits as described above, wherein each of the security outfits further comprises communication means with other security outfits, so that when one of the outfits stops to communicate with other of the outfits via the communication means, an electroshocking system of the outfit enters into the active state, and each other of the outfits alert a security guard thereof of a possible kidnap.

According to one embodiment of the invention, the communication means is for tens of meters.

According to another embodiment of the invention, the communication means is for hundreds of meters.

According to yet another embodiment of the invention, the communication means is for a telephony network.

According to one embodiment of the invention, the each of the security outfits is adapted to allow one member of the group to remotely turn an electroshocking system of another member of the group into its active state.

The reference numbers have been used to point out elements in the embodiments described and illustrated herein, in order to facilitate the understanding of the invention. They are meant to be merely illustrative, and not limiting. Also, the foregoing embodiments of the invention have been described and illustrated in conjunction with systems and methods thereof, which are meant to be merely illustrative, and not limiting.

BRIEF DESCRIPTION OF DRAWINGS

Preferred embodiments, features, aspects and advantages of the present invention are described herein in conjunction with the following drawings.

Figure 1:
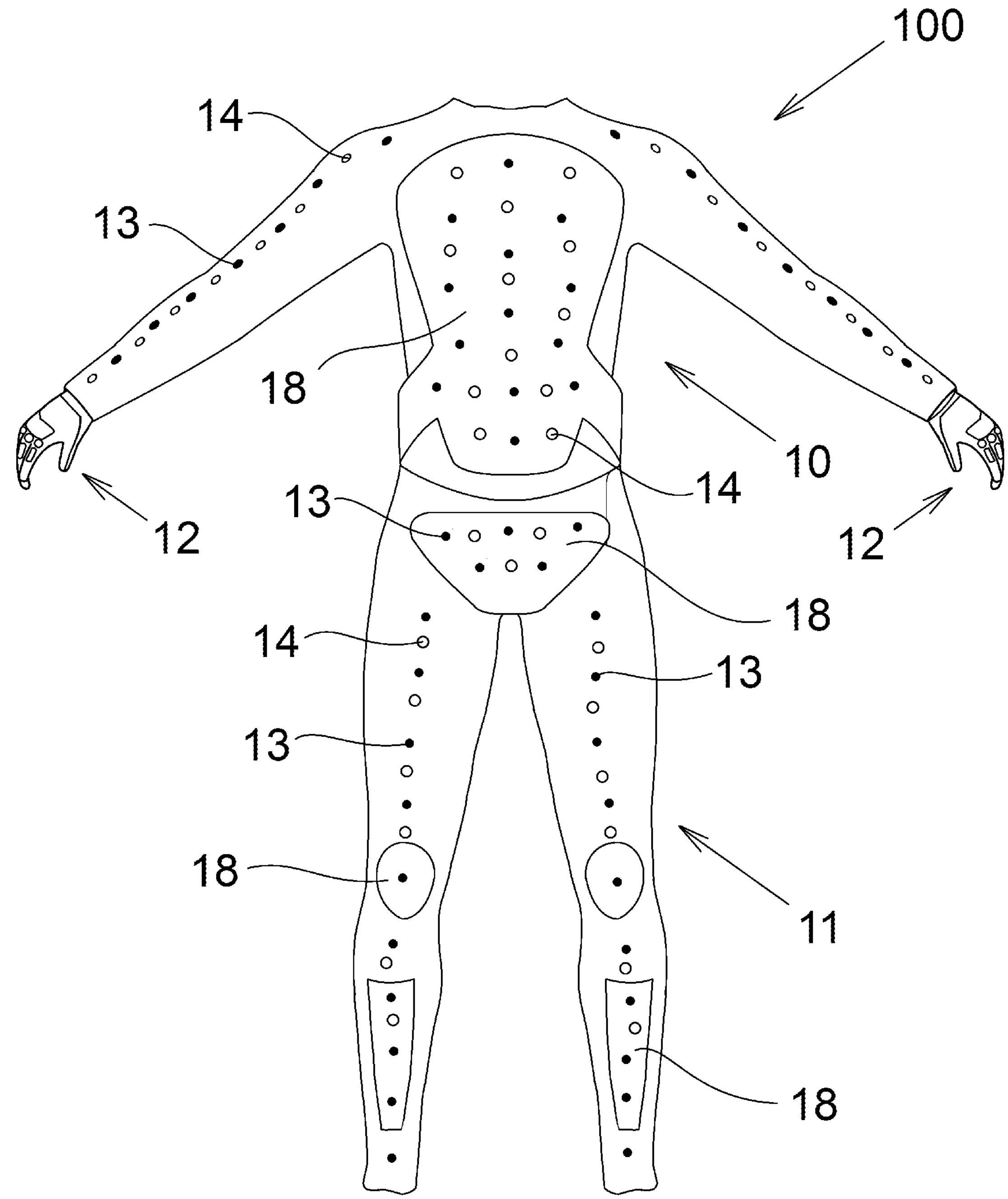
FIG. 1 schematically illustrates a security outfit from a front view, according to one embodiment of the invention.

It should be understood that the drawings are not necessarily drawn to scale.

DESCRIPTION OF EMBODIMENTS

The present invention will be understood from the following detailed description of preferred embodiments ("best mode"), which are meant to be descriptive and not limiting. For the sake of brevity, some well-known features, methods, systems, procedures, components, circuits, and so on, are not described in detail.

The Outfit

The outfit is made of stabbing and cutting resistant fabric. Preferably the outfit may be in a form of an overall.

Alternatively, the outfit may be in a form of a vest and trousers that can be electrically connected to each other. The gloves also can be electrically connected to the sleeves of the outfit.

The outfit can also comprise a collar, for preventing stabbing and cutting the neck of a security guard that wears the outfit.

At the back of the outfit is disposed a box containing the electric and electronic parts of the electric/electronic systems of the outfit, such as a controller, battery, and so on.

On the external side of the outfit are disposed electroshock terminals. Thus once the electroshocking system is activated, upon touching an electroshock terminal by an object, an electroshock is applied on the object.

"An electroshock weapon is an incapacitating weapon. It delivers an electric shock aimed at temporarily disrupting muscle functions and/or inflicting pain without causing significant injury." (From Wikipedia)

The security outfit comprises several systems, such as electroshocking system, and a kidnapping system.

The Fabric

An example for anti-stabbing fabric is of Dyneema company, at the following web site:

https://www.dsm.com/products/dyneema/en_US/technologies/dyneema-technology-platforms/dyneema--anti-stab-technology.html An example for anti-cutting fabric is of CutPRO Clothing company, at the following web site: https://www.cut-pro.com/

Of course, each of these fabrics may comprise both characteristics, anti-stabbing and anti-cutting. Alternatively, the fabric of the outfit can be designed in layers, such that one layer is an anti-stabbing fabric, and another layer is an anti-cutting layers.

The Electroshocking System

The term "electroshocking terminal" refers herein to a device which generates an electroshock upon touching it by an object.

This system comprises electroshocking terminals dispersed on the security outfit, so that an attacker may be electroshocked upon hitting the security guard.

In addition, the outfit also includes gloves on which are deployed electroshocking terminals, so that the security guard may electroshock an attacker by hitting him with his glove.

Preferably, the electroshocking system comprises means for generating a loud sound in order to scare the attacker. Such means may be, for example, a loudspeaker installed on the security outfit.

The electroshocking system has at least two states: an active state in which the electroshocking terminals are active so that when an attacker touches one of the electroshocking terminals, he is electroshocked; and an idle state in which the electroshocking terminals are suspended, i.e., no electroshock is generated upon touching an electroshocking terminal.

According to one embodiment of the invention, in order to activate the electroshocking functionality of the system by the security guard thereof, the security guard closes his fist. This operation causes a contact between two points on his gloves, which signals to the electroshocking system to enter into its active state. Releasing his fist, i.e., causing a disconnection between these points, causes the system to go into its idle state, i.e., in which the electroshocking ability of the system is suspended. Of course, this mechanism is merely an example, and other activating/deactivating mechanisms may be employed.

According to one embodiment of the invention, the electroshocking system enters into its active state, as a result of a sudden attack. For example, several piezoelectric sensors are dispersed on the outfit so that when one of the sensors detects a hit of at least a predetermined intensity, it turns the electroshocking system into its active state.

According to one embodiment of the invention, the electroshocking system enters into its active state as a result of a sudden movement of a security guard's arm. For example, each arm of the security outfit comprises an accelerometer, which indicates a "sudden" movement (e.g., its speed exceeds a certain threshold).

According to another embodiment of the invention, the tilt of the guard is metered constantly, and upon detecting that the guard lies down, the electroshocking system enters into its active state.

Perimeter Alerting System

As explained, the basis of the present invention is the electroshocking system which employs electroshocking terminals. However, such system is dangerous as every touch on an electroshocking terminal causes the touching object to be electroshocked. As such, the electroshocking system must be left off (its idle state) and turned on (its active state) only when dealing with a hostile person.

The Perimeter Protection system enables the electroshocking system to be put into its active state automatically upon detecting a hostile object that threatens the security guard thereof.

At present, Mobileye is a car alarm systems that warns that the car is getting too close to another vehicle or person. Such systems are based on image processing.

According to one embodiment of the invention, a Perimeter Alerting System is added to the security outfit. This system continuously photographs the rear of the security guard and analyzes the image. When identifying a threatening object, whether a person or a vehicle, the electroshocking system is activated automatically.

Of course, Mobileye's technology is just one way, and there are other threat detection technologies. For example, there are technologies to measure the distance of a sensor from an object.

For example, a control module can continuously analyze distance sensor(s) samples in order to detect an object that is "rapidly" approaching the sensor(s). Upon detecting such an object, the electroshocking system is automatically activated, and the security guard is alerted. A "rapid" approaching can be determined by a threshold. If the approaching speed is faster than the threshold, it may indicate a threat of a hostile object.

Of course, other detection technologies may be employed, such as intensity of an infrared signal (that indicates a vicinity of an object to the security guard).

The Group Security System In another aspect, the present invention is directed to a system for providing improved security to a group of security guards. According to this embodiment of the invention, each of the security guards is using a security outfit as described above, which communicates with each other by "short-range" wireless communication, such as Bluetooth.

"Bluetooth is a type of wireless communication used to transmit voice and data at high speeds using radio waves. It is a standard protocol for short-range radio communications between many different types of devices, including mobile phones, computers, entertainment systems and other electronics. Devices need to be within approximately 10 meters of each other, and the typical data transfer rate is around 2 megabits per second (Mbps)." (From study.com)

Such improved security ability may be used, for example, for detecting a kidnap of one of the members of the group, remotely activating the electrifying ability of an injured security guard that is unable to function, and more.

Kidnap detection may be carried out as follows: the Bluetooth system of each of the members of the group continuously checks the Bluetooth connection with the other members of the group. At the group level, if one of the members of the group is not communicating with all the other members, it indicates that this member is out of the communication range with all the members, and therefore a kidnaping alert situation is detected. At the individual level, if the communication with all the other members is interrupted, it indicates a possible kidnaping situation.

When a kidnaping situation is detected, the system of the kidnaped member may play a loud alert sound, activate the electroshocking system, detect the geographical location of the kidnaped member (via a GPS terminal) and transmit to the other members of the group the geographical coordinates of this location via a cellular telephone network, etc.

The alerting system of the other members of the group may sound an alert to inform each of the members that one of the members of the group has been kidnaped, etc.

The system may further be adapted to allow one member to remotely activate the system of another member. Thus, if one of the members of the group is attacked, another member of the group may activate his electroshocking system.

When applied on a longer distance, the communication between the members can be carried out, for example, by Wi-Fi communication, the cellular network (e.g., GSM), and so on.

"Wi-Fi is a family of radio technologies commonly used for wireless local area networking (WLAN) of devices." (From Wikipedia)

The Global System for Mobile Communications (GSM) is a standard developed by the European Telecommunications Standards Institute (ETSI) to describe the protocols for second-generation (2G) digital cellular networks used by mobile devices such as mobile phones and tablets.

Figure 2:
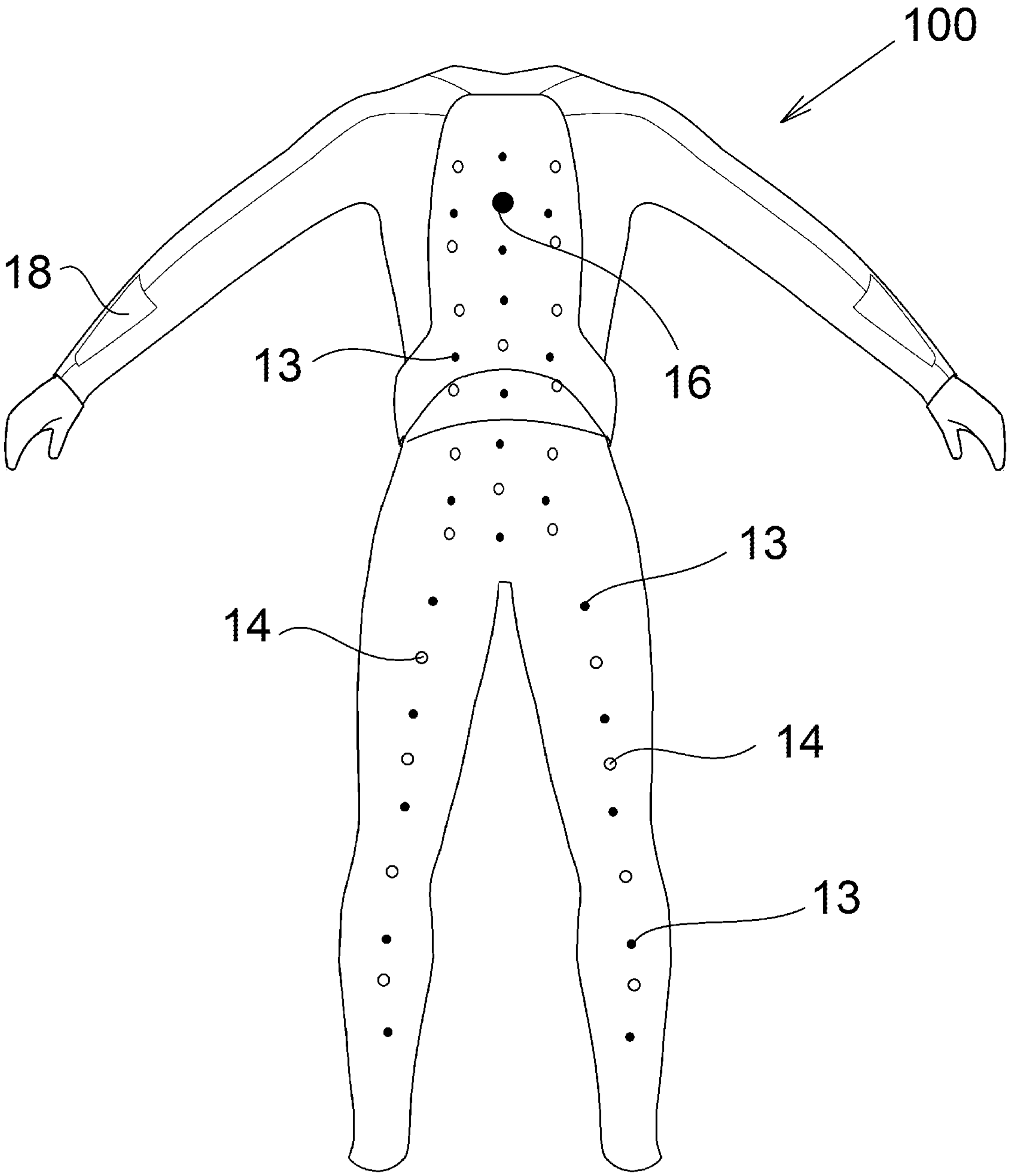
FIG. 2 is a back view thereof.

FIG. 1 schematically illustrates a security outfit from a front view, according to one embodiment of the invention; and FIG. 2 is a back view thereof.

The security outfit, which is marked herein by reference numeral 100, comprises a vest 10, trousers 11 and gloves 12.

The outfit may be in a form of an overall or as separated parts: vest, trousers, and gloves.

The outfit fabric is stabbing and cutting resistant. In order to protect the user thereof from a hit with a blunt object, the outfit may comprise hardened regions 18.

On the surface of the outfit are dispersed electroshocking terminals 13, which electroshock any object that comes in contact with one or more of these electroshocking terminals.

When the electroshocking terminals are active, they may put in jeopardy any individual that mistakenly touches a terminal. As such, the terminals are usually not active, unless they have been activated.

The outfit may also comprise mechanical hit sensors 14, such as piezoelectric sensors, which indicate that a mechanical force, such as a hit, has been applied thereon. If the hit intensity is greater that a predetermined threshold, the terminals are activated automatically.

Figure 3:
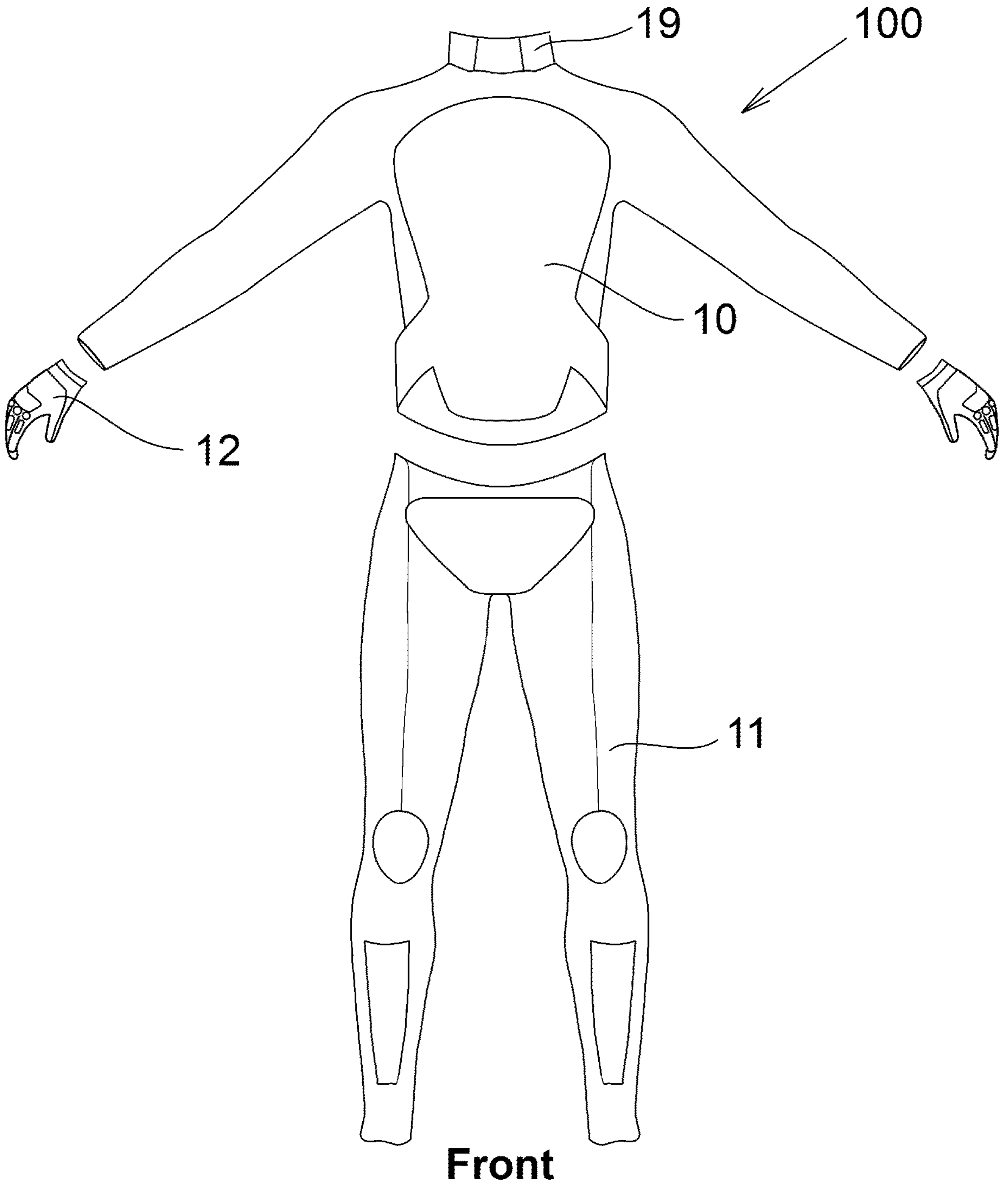
FIG. 3 schematically illustrates a security outfit from a front view, according to one embodiment of the invention.

FIG. 3 schematically illustrates a security outfit from a front view, according to one embodiment of the invention.

According to this embodiment of the invention, the vest, trousers and gloves are separated; however when wearing the outfit, the parts are electrically connected, such as by snap connectors. The electrical connection provides electricity to the electroshocking terminals dispersed on the all the parts of the outfit, i.e., vest, trousers and gloves.

Figure 4:
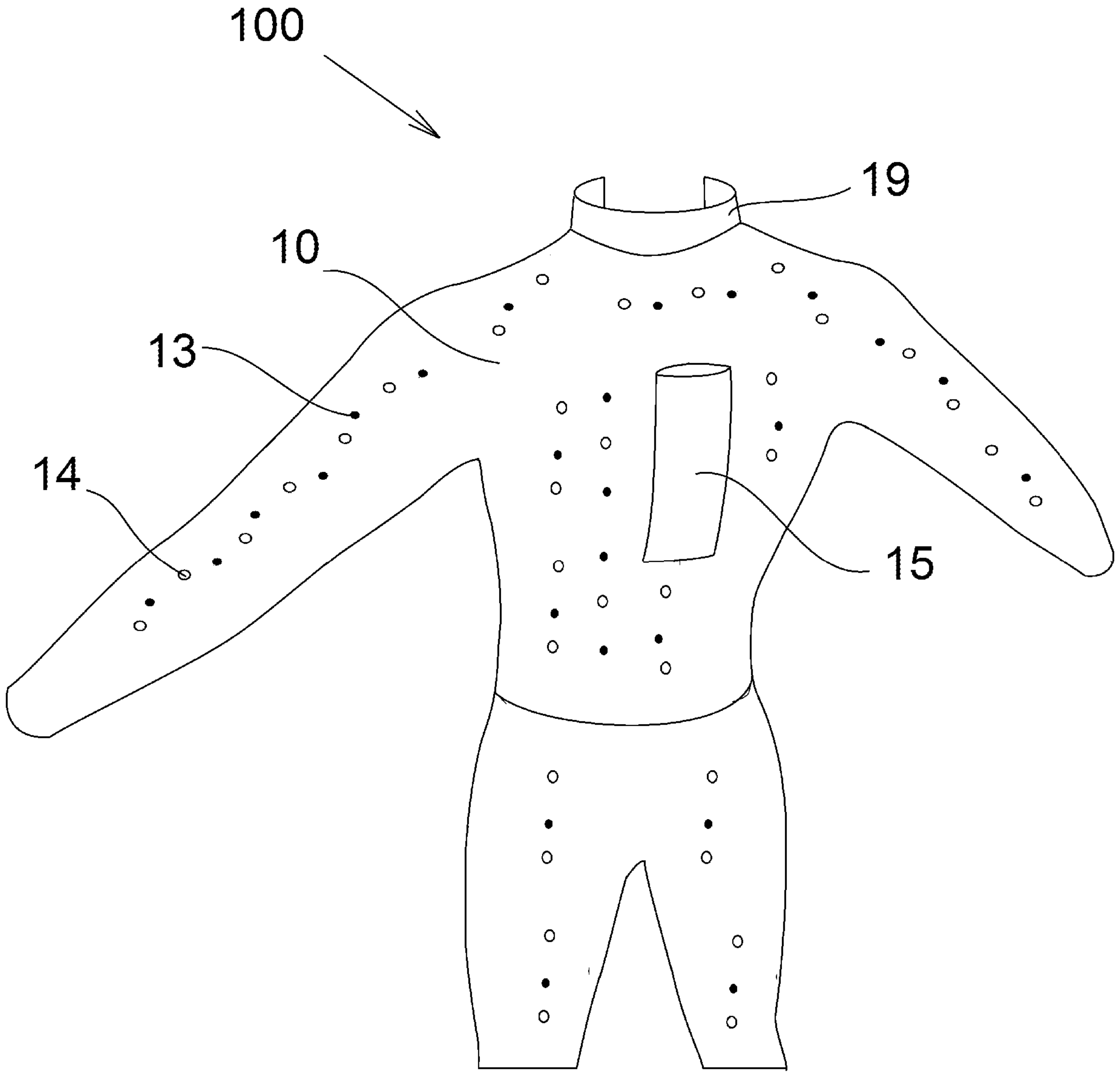
FIG. 4 is a back view a security outfit, according to one embodiment of the invention.

FIG. 4 is a back view a security outfit, according to one embodiment of the invention.

At the back of the vest 10 is installed a protective casing 15, into which are disposed the electronic parts of the system (controller), battery, etc.

The protective casing 15 is preferably made of hard rigid material, although it may comprise some flexibility in order not to interfere with the guar movement.

Wires (not illustrated) lead out from the electrical part ("controller") which is disposed inside the protective casing to the electroshocking terminals 13 and hit sensors 14 disposed across the protective outfit 100.

Figure 5A:
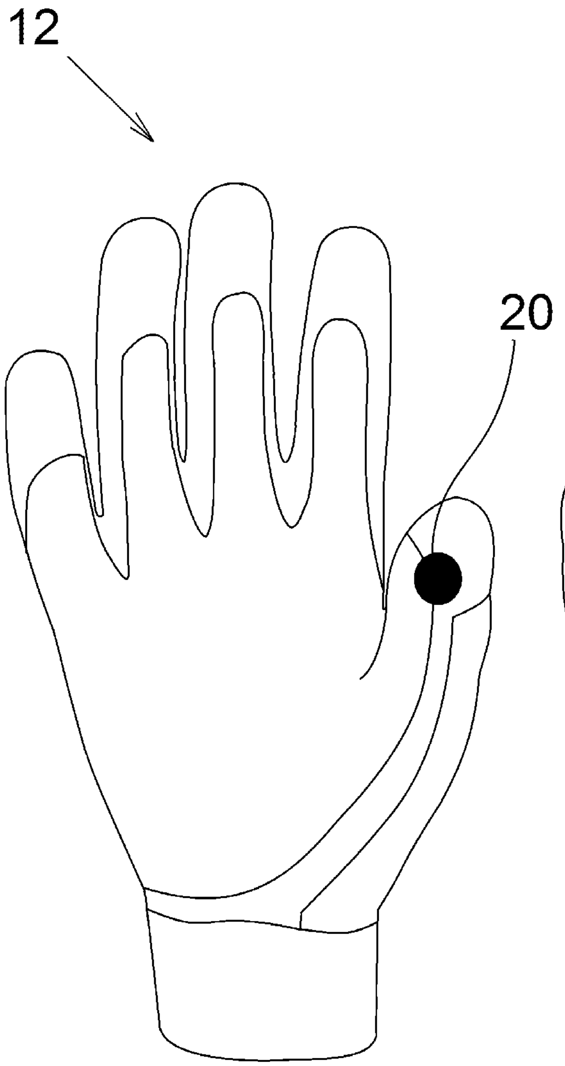
FIG. 5*a* is a back view of a right glove of a security outfit, according to one embodiment of the invention.
Figure 5B:
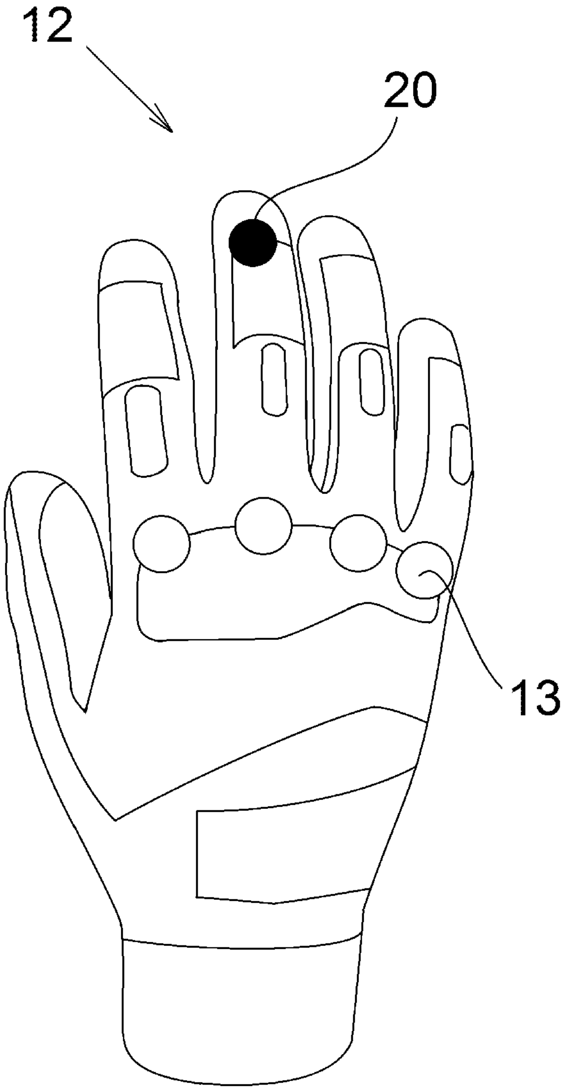
FIG. 5*b* is a front view thereof.

FIG. 5*a* is a back view of a right glove of a security outfit, according to one embodiment of the invention. FIG. 5*b* is a front view thereof.

The glove comprises a mechanism for intentionally turning on an electroshocking system of a security outfit, according to one embodiment of the invention.

Two contacts 20 are disposed on the glove: one contact on the thumb of the glove, and the other on the middle finger.

Figure 6:
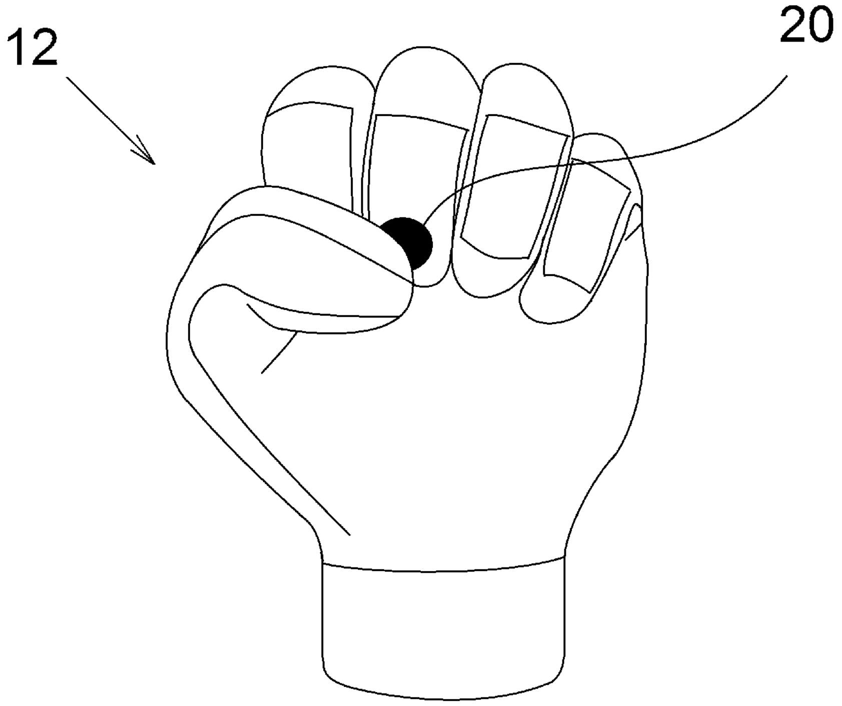
FIG. 6 schematically illustrates a glove in a fist form, according to one embodiment of the invention.

The security guard that wears the glove can turn on the electroshocking system of a security outfit by closing his hand to a fist. When the glove is in a fist form, as illustrated in FIG. 6, contacts 20 contact each other, and thereby signaling to the electroshocking system to enter into its active state. In this situation the electroshocking system becomes active for a time period, e.g., 5 minutes. The user may retain the active state longer by closing his glove once again.

Figure 7:
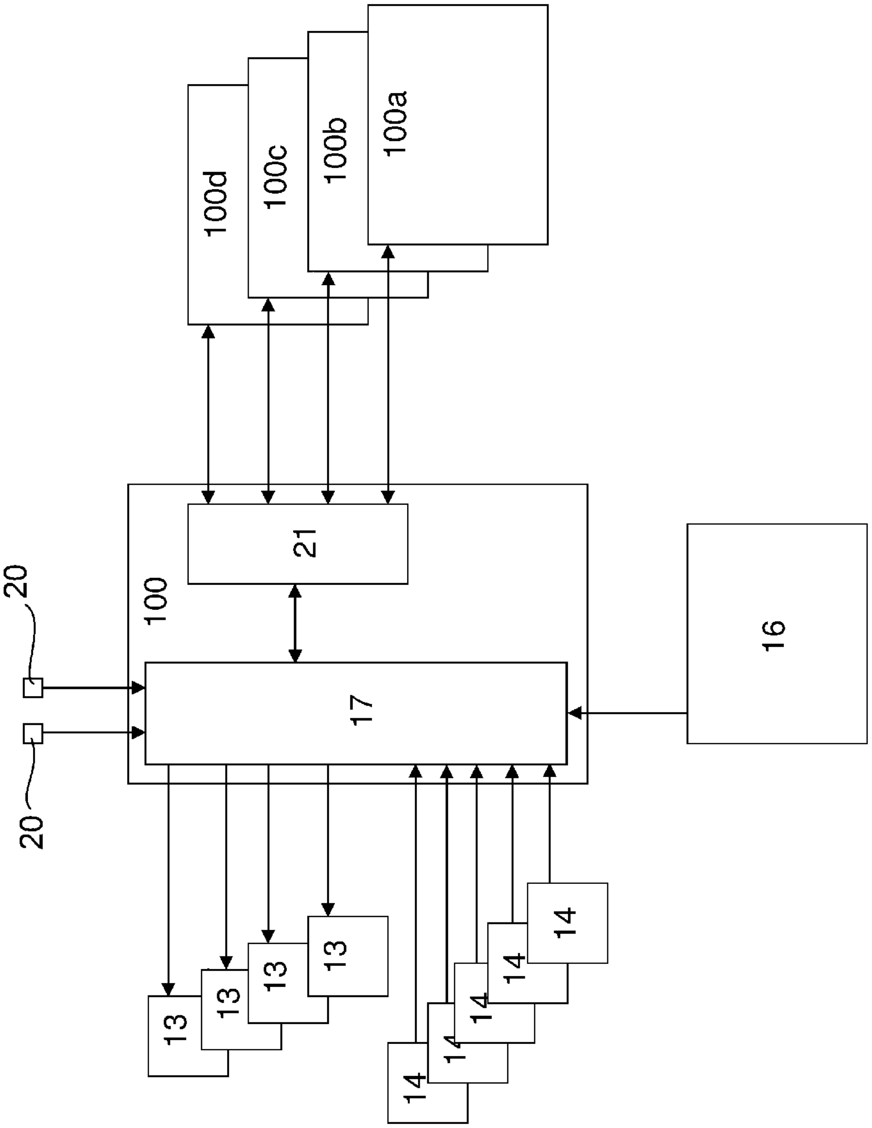
FIG. 7 is a block diagram schematically illustrating the electric/electronic system of a security outfit, according to one embodiment of the invention.

FIG. 7 is a block diagram schematically illustrating the electric/electronic system of a security outfit, according to one embodiment of the invention.

The processor 17 is the "brains" of the system. When it detects a contact between contacts 20, the processor puts the electroshocking system into its active state, in which the electroshock terminals 13 are active. When a mechanical hit sensors 14 detects a hit intensity greater than a predefined threshold, the processor puts the electroshocking system into its active state. The same happens when the processor 17, which analyzes the input of the camera 16, detects a situation in which an object approaches to the camera in a velocity greater than a predetermined threshold.

The system also comprises a communication module 21, which communicates with the security outfit of the other members of a group, 100*a*, . . . , 100*d*. By interacting with the members of the group, the processor detects if one of the members does not communicate with all the other members of the group, which may indicate a kidnap. In such a situation, the electroshocking system of each of the members may enter into its active state, and the members are alerted of a possibility that one of the members has been kidnaped.

The communication may be carried out via a short range communication (such as Bluetooth), greater range (such as Wi-Fi), or even via a telephony network.

In the figures and/or description herein, the following reference numerals (Reference Signs List) have been mentioned:

Each of numerals 100, 100*a*, . . . , 100*d* denotes a security outfit, according to one embodiment of the invention;
numeral 10 denotes a vest of a security outfit;
numeral 11 denotes trousers of a security outfit;
numeral 12 denotes a glove of a security outfit;
numeral 13 denotes an electroshocking terminal;
numeral 14 denotes a hit sensor;
numeral 15 denotes a protective casing;
numeral 16 denotes a camera used as a distance sensor;
numeral 17 denotes a processor;
numeral 18 denotes an hardened region of the outfit;
numeral 19 denotes a collar;
numeral 20 denotes a contact; and
numeral 21 denotes a communication module.

The foregoing description and illustrations of the embodiments of the invention has been presented for the purposes of illustration. It is not intended to be exhaustive or to limit the invention to the above description in any form. Any term that has been defined above and used in the claims, should to be interpreted according to this definition.

The invention claimed is:

1. A security outfit, comprising:
a stabbing and cutting resistant outfit;
a stabbing and cutting resistant gloves; and
an electroshocking system including a plurality of controllable electroshocking terminals dispersed on an external side of said outfit and gloves;
a mechanism employing a sensor for detecting an object approaching to said security outfit in a velocity greater than a predetermined threshold, and consequently turning said electroshocking system into said active state;
or a sensor for detecting a movement of an arm of a security guard in a speed greater than a threshold, so that as a result said electroshocking system enters into its active state;
or a sensor for metering a vertical deviation of said security guard, so that upon exceeding a predetermined threshold, said electroshocking system enters into its active state;
or a camera for continuously photographing a back area of said security guard, and an image processing system, for detecting an object approaching to said security guard in a velocity greater than a predetermined threshold, so that as a result said electroshocking system enters into its active state;
or at least one distance sensor for continuously metering a distance between an object and said security guard, for detecting an object approaching to said security guard in a velocity greater than a predetermined threshold, so that as a result said electroshocking system enters into its active state;
or a tilt sensor, for detecting whether said security guard is lying, so that as a result said electroshocking system enters into its active state;
wherein said electroshocking system comprising an active state, being a state in which said terminals are active; and an idle state, being a state in which said electroshocking terminals are suspended.

2. The security outfit according to claim 1, further comprising a collar, for preventing stubbing and cutting a neck of a user thereof.

3. The security outfit according to claim 1, wherein entering into said active state is carried out by a mechanism for detecting a fist form of one of said gloves.

4. The security outfit according to claim 3, wherein said fist form is detected by sensors detecting a contact of a thumb of one of said gloves with a middle finger of said glove.

5. The security outfit according to claim 1, further comprising a mechanism comprising a distance sensor for detecting presence of an object closer than a predefined threshold to said security guard, and consequently turning said electroshocking system to said active state.

6. The security outfit according to claim 1, further comprising an audio system for sounding a sound along with electroshocking.

7. The security outfit according to claim 1, further comprising mechanical hit sensors dispersed on said outfit, so that as a result of detecting a hit of a force greater than a predetermined threshold, said electroshocking system enters into its active state.

8. The security outfit according to claim 7, wherein said mechanical hit sensors are of piezoelectric.

9. The security outfit according to claim 1, further comprising an infrared sensor, for detecting presence of an object in a vicinity of said security guard, so that as a result said electroshocking system enters into its active state.

10. The security outfit according to claim 1, further comprising an audio system, for playing a sound upon electroshocking.

11. The security outfit according to claim 1, further comprising communication means with other security outfit(s), so that when one of said other security outfit(s) stops to communicate with said security outfit via said communication means, an electroshocking system of said security outfit enters into said active state, and each other of said other security outfit(s) alert a security guard thereof of a possible kidnap.

12. The security outfit according to claim 11, wherein said communication means is for tens of meters.

13. The security outfit according to claim 11, wherein said communication means is for hundreds of meters.

14. The security outfit according to claim 11, wherein said communication means is for a telephony network.

15. The security outfit according to claim 11, further adapted to remotely turn an electroshocking system of another outfit into its active state.

* * * * *